United States Patent
Chen (10) Patent No.: US 6,382,365 B1
(45) Date of Patent: May 7, 2002

(54) SINGLE-ACTUATION, SYNCHRONOUS DUAL CLOSURE STRUCTURE DISC BRAKE DEVICE

(76) Inventor: Jun-Ru Chen, No.106, Min-Sheng Road, Chang-Hua City (TW)

( * ) Notice: Subject to any disclaimer, the term of this patent is extended or adjusted under 35 U.S.C. 154(b) by 0 days.

(21) Appl. No.: 09/722,287

(22) Filed: Nov. 28, 2000

(51) Int. Cl.[7] ............................................. F16D 55/08
(52) U.S. Cl. ................................... 188/26; 188/72.8
(58) Field of Search ..................... 188/26, 72.1, 72.3, 188/72.8, 72.9, 196 M, 196 MA, 196

(56) References Cited

U.S. PATENT DOCUMENTS

| | | | | |
|---|---|---|---|---|
| 5,358,078 A | * | 10/1994 | Gajek et al. | 188/72.4 |
| 5,960,914 A | * | 10/1999 | Isai | 188/72.8 |
| 6,148,964 A | * | 11/2000 | Huang | 188/26 |
| 6,206,144 B1 | * | 3/2001 | Di Bella | 188/26 |
| 6,230,849 B1 | * | 5/2001 | Lumpkin | 188/24.12 |

* cited by examiner

*Primary Examiner*—Christopher P. Schwartz
(74) *Attorney, Agent, or Firm*—Troxell Law Office PLLC (57) ABSTRACT

A single-actuation, synchronous dual closure disc brake device includes a mounting plate installed onto a fork leg, a U-shaped movable caliper base movably attached to the mounting plate and having an anti-rotation check opening, and a brake cable capable of being pulled and released to actuate a bidirectional, thrust cylinder driver. The thrust cylinder driver is ensleeved within the anti-rotation check hole in the center section of the mounting plate and reciprocally moves an inner motion guide sleeve and an outer motion guide sleeve. Such movement brings inner and outer brake pads into the inner and outer motion guide sleeves double-sided and opposing clamping of a brake disc.

4 Claims, 8 Drawing Sheets

SINGLE-ACTUATION, SYNCHRONOUS DUAL CLOSURE STRUCTURE DISC BRAKE DEVICE

BACKGROUND OF THE INVENTION

1) Field of the Invention

The invention herein relates to a single-actuation, synchronous dual closure structure disc brake device having a single brake cable actuated bidirectional-type thrust cylinder driver that enables the achievement of an inner brake pad and an outer brake pad arranged at two sides capable of synchronous, opposing travel, and equalized force, and double-sided brake clamping operation.

2) Description of the Prior Art

The comparatively numerous single-actuated type disc-type brake device now utilized in the industrial world consists of a mounting plate 2 installed onto a fork leg having the bolt 21 situated horizontally through its lateral surface providing for a brake cable 31 that pulls and releases a fixed axis, reciprocating, and pivoting lever 32 to control axial rotation for the inward end-surfaced extension and retraction of a single-direction travel thrust cylinder driver 33 of a movable base 3. Of which, the said thrust cylinder driver 33 has installed at its interior side and end surface an outer brake pad 341, with an inner stop surface 3A situated at the rear extent and extending from the same movable base 3 that provides for the installation of another inner brake pad 342 at its interior lateral surface, thereby enabling the respective positioning at the two sides of a brake disc 4 and the forming of a brake clamping arrangement (as shown in FIG. 1-A).

Figure 1:
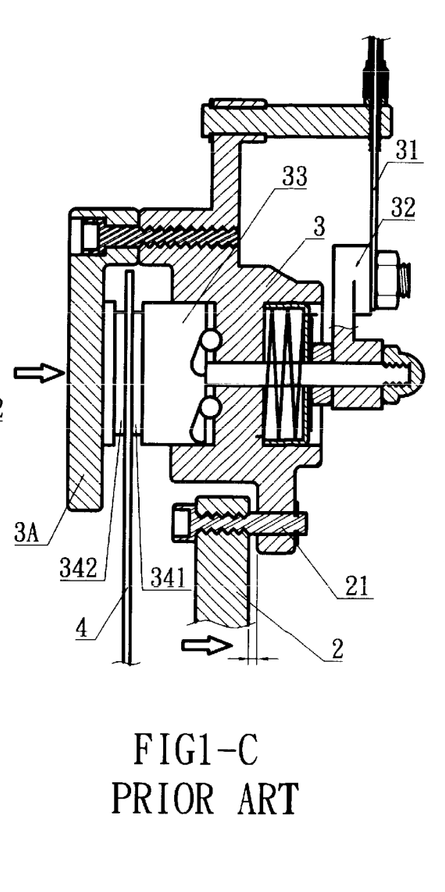

In this type of device, when the interior side and end surface of the thrust cylinder driver 33 is impelled to extend in front section travel, the outer brake pad 341 is pushed inward and first brought pushing against the outer side of the brake disc 4 to achieve the first phase of partially closed clamp braking operation at the outer disc surface (as shown in FIG. 1-B).

When the typist cylinder driver 33 continues to be driven and thus extend in rear section travel, the outer brake pad 341 continues being pushed inward and, due to blockage posed by the brake disc 4, it can only proceed in the opposite direction and the movable base 3 moves laterally outward in backward movement such that the inner brake pad 342 at the interior face of the inner stop surface 3A correspondingly moves outward in forward movement and then positioned pushing against the outer side of the brake disc 4 to achieve the second phase of fully closed clamp braking operation at the inner disc surface (as shown in FIG. 1-C).

Although such a structure is capable of executing a double surfaced clamping closure at the two sides of the brake disc 4, the timing difference as the two brake pads are brought into closure one after another results in physical application at unequal force and a loss of frictional balance and, in addition to precluding efficient and precise braking operation, each instance the outer brake pad 341 is first pushed outward towards the brake disc 4, the thin-type brake disc 4 becomes inclined slightly inward after protracted utilization and, furthermore, its service life is correspondingly reduced. As such, manufacturers must utilize a brake disc of greater thickness to overcome this; however, such utilization results in a brake disc that has the shortcomings of heavier weight, excessive space occupance, and increased production cost.

Figure 2:
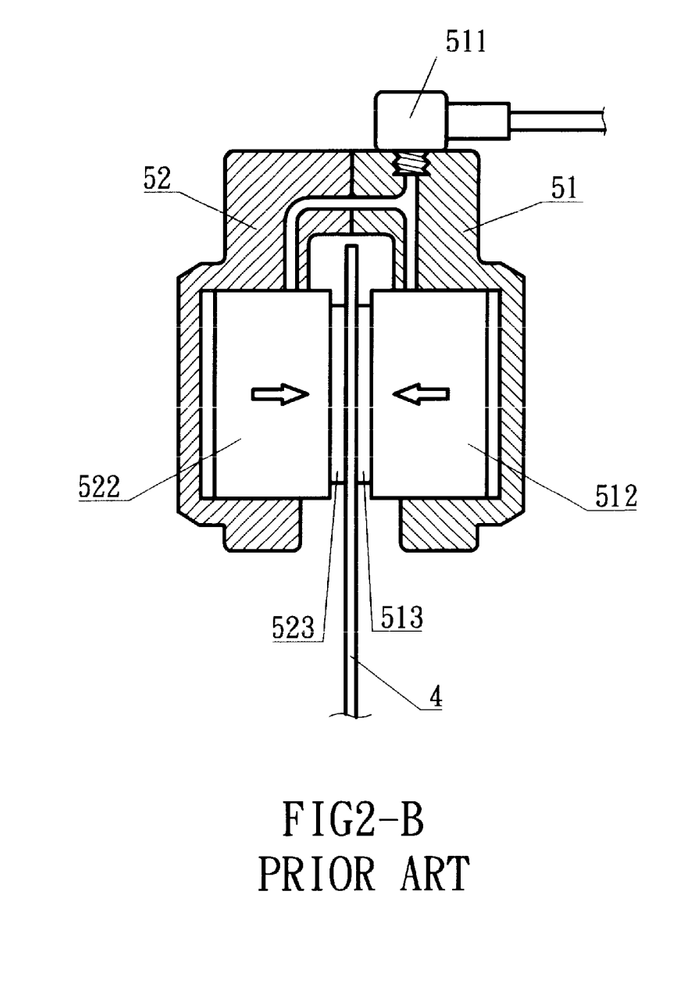

Another more improved structure is a kind of double-actuated type disc brake device (as shown in FIG. 2-A), its difference being the installation of a pair of mounting bases 51 and 52 at the two sides of a brake disc 4 and external hydraulic lines 511 for pulling and releasing and thus controlling at its interior section single-direction thrust cylinder drivers 512 and 522 that have respectively installed at their interior sides and end surfaces outer and inner brake pads 513 and 523 for opposingly faced, laterally inward, end-surfaced extension and retraction travel control.

In such devices, the two thrust cylinder drivers 512 and 522 are inner laterally, end-surfaced, and synchronously driven into extension, with the outer and inner brake pads 513 and 523 thereby brought synchronously against the two sides of the brake disc 4 to execute closure (as shown in FIG. 2-B). Although the two-sided, synchronous, and opposed closure at the brake disc 4 disc surfaces is advantageous in that no skewing occurs, the pair of thrust cylinder drivers 512 and 522 results in greater cost, additional malfunctions, and other related problems; for example, fluid leakage from the hydraulic thrust cylinder drivers 512 and 522 easily occurs, resulting in reduced pressure or pressure losses that lead to pressure imbalances inside the two lateral tubes and, furthermore, the pressure impelling the outer and inner brake pads 513 and 523 becomes unequal, with the pressure at the two sides of the brake disc 4 similarly unequal such there is the shortcoming of non-synchronous application during clamping closure.

SUMMARY OF THE INVENTION

The primary objective of the invention herein is a single bidirectional thrust cylinder driver installation in which during the synchronously and axially oriented extension of the two lateral end surfaces, an outer brake pad at the interior lateral surface of an inner motion guide sleeve is moved inward from an outer motion guide sleeve backward to a ⊓-shaped moveable caliper base, causing the movement of the inner brake pad situated vertically at its interior surface; furthermore, in the said assembly constituted, the inner brake pad is actuated into operation by a single brake cable and simultaneously completes an opposing and synchronous clamping operation to achieve at the two sides of the brake disc at the center section an equalized force and bidirectional closure that is balanced, stable, and precise in brake clamping operation.

Another objective of the invention herein is a single bidirectional thrust cylinder driver that synchronously and with an equalized force actuates the inward closure and return of two laterally-disposed outer and inner brake pads such that the brake disc is kept vertical to facilitate equal friction at the outer and inner brake pads to decrease overall friction and thereby prolong device operation and durability and, furthermore, save space, lighten weight, and be more economically feasible.

Yet another objective of the invention herein is a single bidirectional thrust cylinder driver that actuates the inward closure and return of two laterally-disposed outer and inner brake pads that achieves more operational efficiency than conventional double thrust cylinder driver synchronous double-closure devices and compared to single thrust cylinder drivers is structurally simpler, easier to fabricate and susceptible to fewer malfunctions, and thus more economical and practical.

The structural utilization, operation, and other aspects of the present invention are elaborated in the following detailed description of the invention herein.

BRIEF DESCRIPTION OF THE DRAWINGS

FIG. 1-A, FIG. 1-B, and FIG. 1-C are cross-sectional drawings of a conventional single-actuated disc brake device with the clamping mechanism shown unclosed, partially closed, and fully closed, respectively.

FIG. 2-A and FIG. 2-B are cross-sectional drawings of a conventional double-actuated disc brake device with the clamping mechanism shown unclosed and fully closed, respectively.

FIG. 4-A is an isometric drawing of the invention herein.

FIG. 4-B is an orthographic drawing of the invention herein.

FIG. 5-A and FIG. 5-B are cross-sectional drawings of the invention herein in with the clamping mechanism shown unclosed and fully closed, respectively.

FIG. 6-A and FIG. 6-B are cross-sectional drawings of a hydraulically actuated structure structural embodiment of the invention with the clamping mechanism shown unclosed and fully closed, respectively.

DETAILED DESCRIPTION OF THE INVENTION

Figure 3:
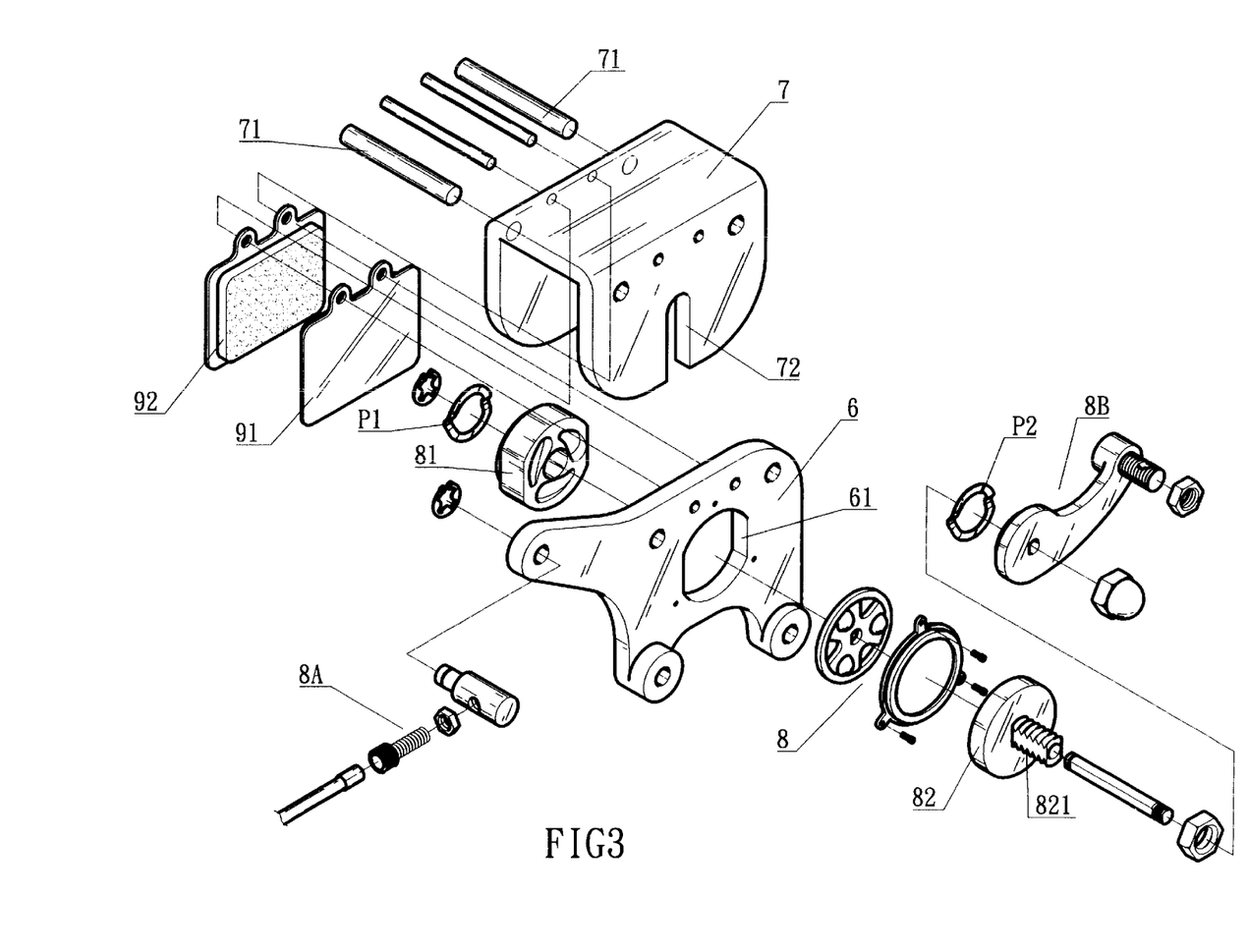
FIG. 3 is an exploded drawing of the invention herein.
Figure 4:
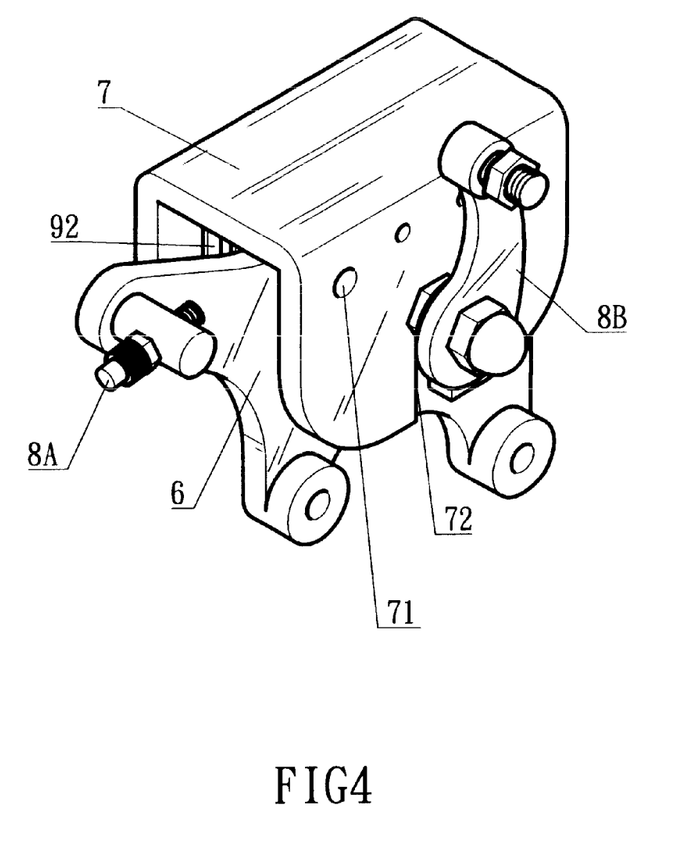
FIG. 4 is an isometric drawing of the invention herein.
Figure 5:
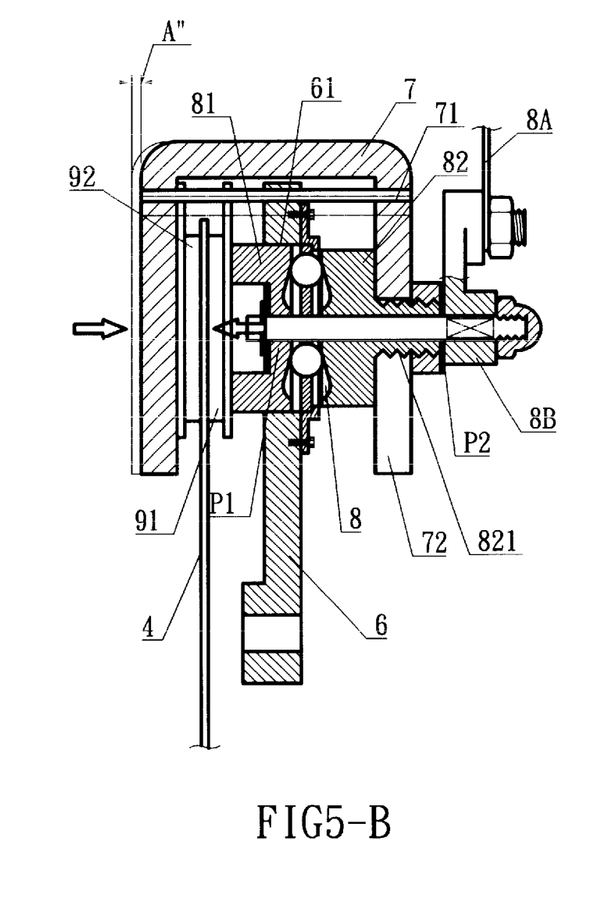
Figure 6:
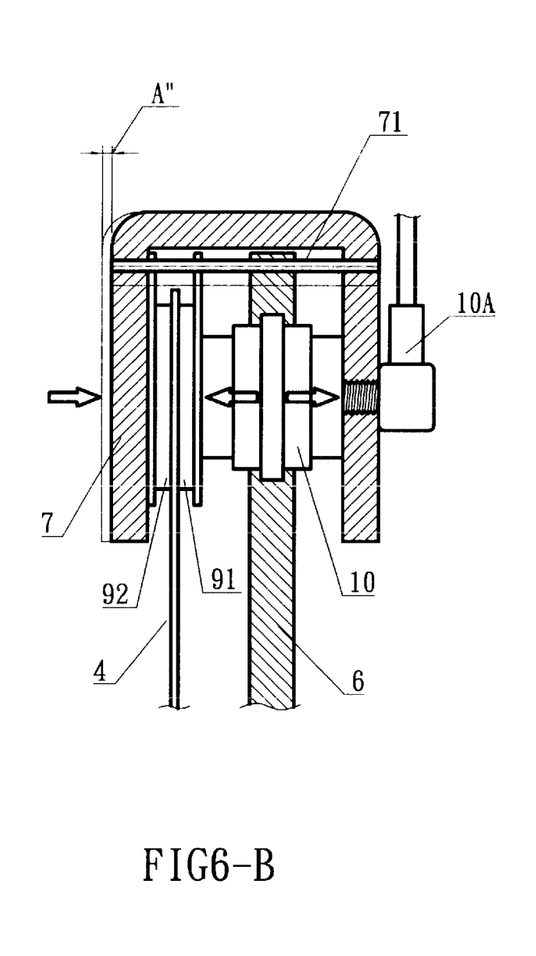

Referring to FIG. 3, FIG. 4, FIG. 4-A, FIG. 4B, and FIG. 5-A, the invention herein is comprised of:

A mounting plate 6 installed onto a fork leg S; the said mounting plate 6 having formed in its center section area an anti-rotation check hole 61.

A ⊓-shaped moveable caliper base 7; disposed along the interior section of the body of the base is one or a plurality of horizontal rods 71 that are pivotably conjoined cross-wise at the upper extent of the mounting plate 6 (the said horizontal rod(s) 71 can be installed into position within the said moveable base or another equivalent structure can be substituted in its place); the ⊓-shaped moveable caliper base 7 has formed in the center section of its exterior side an anti-rotation check opening 72; and the ⊓-shaped moveable caliper base 7 has a vertically situated interior lateral surface area that provides for the installation of an inner brake pad 92.

A thrust cylinder driver 8 that is fixed at the outer lateral surface of the anti-rotation check hole 61 in the center section of the mounting plate 6; the said thrust cylinder driver 8 has a brake cable 8A capable of being pulled and released to control the axial rotation of a fixed axis, reciprocal swinging lever 8B at its rear extent that serves as a two-sided synchronous, axially oriented, and end surfaced extension and retraction movement control, bidirectional, synchronous, and equalized force-type thrust cylinder driver structure, wherein:

There is an inner motion guide sleeve 81 having a withdrawing tensile return device P1 (which can be a leaf spring, circular spring, or other substitutable types), the outer periphery of which is physically ensleeved within the anti-rotation check hole 61 in the center section of the mounting plate 6 and the rear end surface is pushing against the inner lateral end surface of the thrust cylinder driver 8 such that it is subject to the impelled forward and backward reciprocal movement inward of the thrust cylinder driver 8; and the interior lateral surface area of the inner motion guide sleeve 81 provides for the installation of an outer brake pad 91.

There is an outer motion guide sleeve 82 having a forward moving tensile return device P2 (which can be a leaf spring, circular spring, or other substitutable types) that is physically ensleeved against the outer lateral and vertical surface area of the ⊓-shaped moveable caliper base 7, furthermore, its rearward extending shaft 821 is sleeved into the anti-rotation check opening 72 in the outer lateral surface of the ⊓-shaped moveable caliper base 7 such that its front end is pushing against the outer lateral end surface of the bidirectional-type drive structural component and thus subject to being impelled by it forward and backward in reciprocal movement outward.

In the said device, utilizing the mounting plate 6 installed on the fork leg S enables the outer brake pad 91 and the inner brake pad 92 to be correspondingly positioned around the two sides of the brake disc 4 at the lateral area of the fork leg S and serve as a predisposed fixed intervallic arrangement such that when the bidirectional-type thrust cylinder driver 8 is not being impelled into a two-sided, axially oriented, end surfaced, and synchronous extension action, the inner and outer motion guide sleeves 81 and 82 remain stationary at their original retracted position, with the outer brake pad 91 and the inner brake pad 92 maintained opened around the brake disc 4 in the unclosed state (as shown in FIG. 5-A).

When the bidirectional-type thrust cylinder driver 8 is actuated into two-sided, axially oriented, and synchronous extension by the pulling and releasing of the brake cable 8A and the lever 8B, the opposing shove causes the inner motion guide sleeve 81 within it to push forward against the interior lateral surface of the outer brake pad 91 and move it towards the exterior lateral surface of the brake disc 4 (the degree of forward movement is indicated by the demarcating line labelled A' in FIG. 5-B), at which time the outer motion guide sleeve 82 is synchronously pushed back in the ⊓-shaped moveable caliper base 7 such that the inner brake pad 92 at its interior lateral vertical surface area is moved towards the interior lateral surface of the brake disc 4 (the degree of forward movement is indicated by the demarcating line labelled A" in FIG. 5-B, wherein the degree of movement of A' and A" are equal).

As such, in the said assembly so constituted, the outer and inner brake pads 91 and 92 are actuated into operation by the single brake cable 8A as well as the lever 8B and simultaneously complete a double-sided opposing inward closure and, furthermore, the degree of movement and stress of the synchronous clamping operation are both equal (as shown in FIG. 5-B), with the arrangement capable of achieving at its center section area brake disc 4 an optimized equalized stress and synchronized double closure clamping operation; given the pre-configured withdrawing tensile return device PI and the forward moving tensile return device P2, when the applied force impelling the bidirectional-type thrust cylinder driver 8 forward is neutralized, the outer and inner brake pads 91 and 92 respectively retract to their original positions, automatically returning to the unclosed default state (as shown in FIG. 5-A).

Additionally, since the thrust cylinder driver structure is conventional and structurally pre-existent, it is not among the innovations of the invention herein; it can be, as indicated in the said FIG. 3, FIG. 4, and FIG. 5, a roller bearing follower, a hydraulic cylinder 10 (or a threaded guide shaft or a crankshaft), or various other commonly known similar structures, with a hydraulic line 10A utilized as an operational substitute for the brake cable 8A to apply pressure and decrease pressure; since the single-actuation, synchronous, double closured structural features and operating efficiency of the invention herein as well a hydraulic device is capable of the same objectives as the previous embodiments (refer to FIG. 6-A and 6-B), it is structurally included within the patent right claims of the invention herein.

What is claimed is:

1. A single-actuation, synchronous dual closure disc brake device comprising:

a fixed mounting plate having formed in a center section area an anti-rotation check hole;

a U-shaped movable caliper base having at least one rod that are pivotably conjoined with said mounting plate, the caliper base having a center section of one side formed with an anti-rotation check opening and an inner brake pad on an interior lateral surface, and located on a first side of a brake disc;

a bidirectional thrust cylinder driver adjacent to said anti-rotation check hole and mounted on said mounting plate, including a swing lever actuated by a brake cable to control the rotation of the thrust cylinder driver;

an inner motion guide sleeve having a withdrawing tensile return device, an outer periphery of the guide sleeve is ensleeved within said anti-rotation check hole so as to be non-rotatable relative to said mounting plate and having a rear end surface pushing against an inner lateral end surface of said thrust cylinder driver such that movement of the thrust cylinder driver causes reciprocal movement of said inner motion guide sleeve, the inner motion guide sleeve including an outer brake pad located on a second side of the brake disc;

an outer motion guide sleeve having a forward moving tensile return device including a rearward extending shaft sleeved in said anti-rotation check opening in the movable caliper base such that a front end pushes against an outer lateral end surface of the bidirectional thrust cylinder driver whereby movement of the thrust cylinder driver causes reciprocal movement of the outer motion guide sleeve, whereby when the bidirectional thrust cylinder driver is actuated by pulling on said brake cable moving said lever, said inner and outer motion guide sleeves are moved thereby bringing said outer and inner brake pads into a stable clamping operation on the brake disc.

2. The disc brake device of claim 1, wherein said bidirectional thrust cylinder driver comprises a roller bearing follower.

3. The disc brake device of claim 1 comprising a plurality of rods pivotably conjoined cross-wise to said mounting plate.

4. The disc brake device of claim 1, wherein said withdrawing tensile return device in the inner motion guide sleeve comprises a circular spring.

* * * * *